Sept. 7, 1965 A. F. DAILY 3,204,523
WALL PERISCOPE
Filed June 13, 1960

INVENTOR
ALAN F. DAILY
BY
HIS ATTORNEYS

United States Patent Office 3,204,523
Patented Sept. 7, 1965

3,204,523
WALL PERISCOPE
Alan F. Daily, Northampton, Mass., assignor to Kollmorgen Optical Corporation, Northampton, Mass., a corporation of New York
Filed June 13, 1960, Ser. No. 35,803
4 Claims. (Cl. 88—72)

This invention relates to improvements in periscopes and it relates particularly to an improved viewing head for wall periscopes used for observing operations or objects in rooms or cells from which personnel must be excluded because of danger of injury from nuclear or other radiation, heat, poisonous gases or the like.

This is a continuation-in-part of U.S. application Serial No. 802,208, filed March 26, 1959, now abandoned.

Wall periscopes of the type provided heretofore are L-shaped instruments having an objective or "head" end at the inner end of a horizontal tube extending through a wall of the room or cell. A vertical tube is connected to the outer end of the horizontal tube outside of the wall and carries an eyepiece at the free end of the vertical tube. Suitable mirrors or prisms are provided to enable the interior of the room or cell to be viewed through the eyepiece. The vertical arm of the periscope can be swung in a vertical plane through about a 90° angle to vary the eyepiece height, so that it can be used by observers of different heights.

At the head end of the tube in the chamber is a viewing prism structure usually including a pair of prisms which can be rotated relatively about a horizontal axis and a right angularly related axis to enable the periscope to scan a solid angle of 180° centered at the objective end of the periscope. Mechanical connections are interposed between the prisms and the movable eyepiece mount which is carried on the vertical arm of the periscope. The connections are such that the line of sight through the prisms is maintained parallel with the optical axis of the eyepiece to enable scanning through a solid angle of about 180°. The elements of the periscopes within the viewing chamber are not covered or shielded for the reason that the image would be distorted by any device capable of protecting the prisms. Moreover, the viewing angle would be restricted by such a protecting device.

In accordance with the present invention, a novel form of dome or head for a wall periscope is provided whereby the disadvantages of the prior viewing heads are overcome. More particularly, in accordance with the present invention, a dome or head structure is provided which protects the viewing head of the periscope and does not distort the image regardless of the adjustment of the viewing prisms. Moreover, the new form of viewing head provides an effective seal against escape of gases or the like, from the interior of the cell or room without in any way restricting the adjustment of the periscope.

For a better understanding of the present invention, reference may be had to the accompanying drawings in which.

Figure 2:
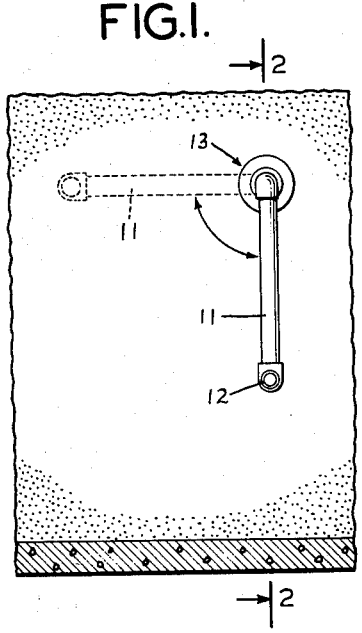
FIGURE 2 is a view in section taken on line 2—2 of FIGURE 1.
Figure 1:
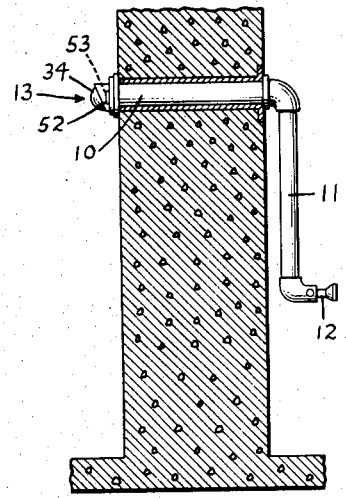
FIGURE 1 is a front elevational view of a portion of a wall of a room or cell in which a typical wall periscope is mounted.

FIGURES 1 and 2 illustrate schematically a conventional wall periscope including a non-rotatable horizontal outer sleeve 10 which centers and supports the horizontal optical tube 16 to which is connected a right angularly related hollow arm 11 containing a lens movable axially for focus adjustment and carrying at its lower end an eyepiece mount 12. As indicated in FIGURE 1, the arm 11 and eyepiece mount 12 thereon can be swung from a vertical to a horizontal position shown in dotted lines, so that the periscope can be used by individuals of different height. Moreover, the eyepiece mount 12 is mounted for rotation around its axis and also for pivoting movement about an axis perpendicular to the axis of the eyepiece.

Figure 3:
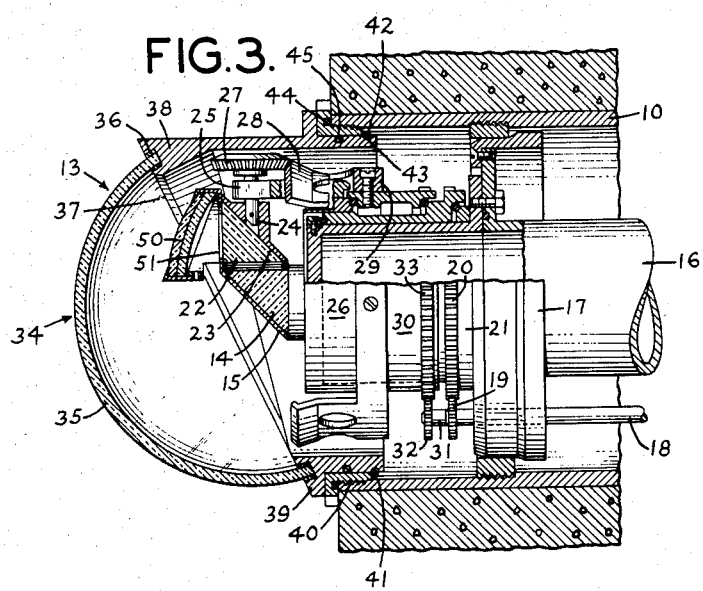
FIGURE 3 is a view in longitudinal section and partly broken away through a viewing head or dome embodying the present invention.

As shown in FIGURES 2 and 3, the periscope has a viewing head 13 which is disposed at the inner end of the horizontal optical tube 16 and within the room, area, cave or cell in which the observations are to be made. The objective of the periscope includes a prism 14 having its reflecting surface 15 disposed at a 45° angle to the axis of a rotatable sleeve 21 mounted concentrically with tube 16 which is mounted rotatably in one or more bearings 17 disposed within the outer sleeve 10. The sleeve 21 is arranged to rotate simultaneously with and in the same direction as the eyepiece mount 12 as the latter is rotated about its axis. Such a rotation can be accomplished by means of a suitable transmission including, for example, the shafts 18 and 31 which are rotatably mounted in apertures in the bearing or bearings 17 and carry gears 19 and 32 which engage and drive gears 20 and 33 on sleeves 21 and 30 independently rotatable on the tube 16. Other equivalent motion transmitting means, such as, friction wheels may be used instead of gears if desired. By rotating the sleeves 21 and 30 in the same direction, the line of sight through the prism 14 can be moved between vertical, in the position shown in FIG. 3, and horizontal, when the prism is rotated 90° from the position shown in FIG. 3.

Cooperating with the prism 14 is a second prism 22 having its reflecting surface 23 at a 45° angle to the incident beam of the prism 14. The line of sight through the prisms, while they are in the position shown in FIGURE 3, is horizontally into the prism 22, thence downwardly from reflecting surface 23 to the reflecting surface 15 of the prism 14, then axially of the tube 16. In order to enable viewing through a solid angle of at least 180°, the prism 22 is carried by a shaft 24 which is rotatably mounted in an arm 25 fixed to a sleeve 26 which rotates with sleeve 21. The axis of the shaft 24 intersects the axis of the tube 16 at the reflecting surface 15 of the prism 14. Both of the prisms 14 and 22 rotate with the tube 16, and the prism 22 is further rotatable about the axis of the shaft 24. Such rotation is accomplished by means of a pinion 27 fixed to the outer end of the shaft 24 and a gear sector 28 fixed to the sleeve 30, which is rotatably mounted on the sleeve 21. Rotation can be imparted to the gear 28 in response to pivoting movement of the eyepiece mount 12 about an axis perpendicular to its optical axis by means of a transmission including shaft 31 connected with the eyepiece mount 12 and carrying a gear 32 which meshes with or drives a gear 33 fixed to the sleeve 30. The above described periscope is conventional.

A novel cover 34 for the prisms embodying the invention is provided to protect the prisms 14 and 22 and the operating mechanism therefor, and, at the same time, permit full utility of their adjustments. The cover includes a transparent dome 35 formed of non-browning glass or the like of somewhat less than hemispherical extent, that is, it covers somewhat less than a 180° solid angle. The edges of the dome 35 are sealed in a groove 36 formed in the inclined edge 37 of a collar 38. A gastight seal is provided between the collar 38 and the dome 35 by injecting a suitable synthetic resin, such as an epoxy resin or the like, into the groove. The collar 38 has a peripheral flange 39 thereon which abuts against a threaded sleeve 40 screwed into the end of the outer sleeve 10 and having an inner end 41 forming a shoulder against which a snap ring 42, carried in a groove 43 in the collar 38, abuts. The ring 42 thereby retains the collar 38 in the end of the outer sleeve 10 with capacity for free rotation therein. Appropriate O-ring seals 44 and 45 may be interposed between the sleeve 40 and the outer sleeve 10, and between the sleeve 40 and the collar 38, respectively, to prevent leakage of gas or air thereby.

The dome 35 constitutes a negative lens of significant refractive power; if optically centered in front of a telescope, its effect could be corrected by refocusing the telescope. However, it is necessary in this instance to place the dome so that it is optically decentered from the telescope axis. This produces unsymmetrical optical aberrations which increase with the square of the magnification of the telescope and are most seriously objectionable even in a system which magnifies a few times. Aberrations thus introduced are eliminated by means of a compensating lens 50 which is mounted on the entrant face 51 of the offset scanning prism 22 of the telescope. Further, to diminish the effect of the dome arising from the offset relation of the scanning prisms, the center of dome curvature is arranged to lie at the intersection of the rotational axes of the two scanning prisms 14 and 22. In this way, the optical effect of the dome on the offset scanning prism 22 plus the compensating lens 50 is constant regardless of the orientation of either of the prisms.

The function of the compensating lens is to cancel the objectionable effect of the decentered dome. The spherical aberration, astigmatism, curvature, distortion, chromatism and comma which would otherwise be produced by the decentered dome are brought within tolerable limits by the compensating lens 50, which consists of an achromatic doublet, itself decentered with respect to the telescope system.

The inclination of the dome 35 enables viewing through the periscope throughout a solid angle of at least 180° by appropriately rotating the entire cover 34. To that end, the collar 38 is provided with small diametrically-spaced bails 52, 53 (FIGURE 2) which may be gripped by the mechanical hands with which radiation cells are usually equipped to enable the cover 34 to be rotated and thereby position the narrower edge of the collar 38 adjacent to the line of sight through the prism 22. Inasmuch as the narrower edge of the collar 38 is behind the point of intersection of the rotational axes of the prisms 14 and 22, viewing through more than a 180° solid angle is possible.

It will be understood that periscopes of the type having covers thereon embodying the present invention may be provided with all of the protective elements and operating conveniences which have been associated with prior wall periscopes. Thus, the arm 11 may be counterbalanced to facilitate its up and down movement, and radiation shields and the like may be mounted in alignment with the outer end of the tube 10. Moreover, the eyepiece end of the periscope may be provided with camera mounts or the like, enabling photographs to be made of reactions or actions taking place within the chamber, cell or room.

Therefore, the form of the invention disclosed herein should be considered as illustrative and not as limiting the scope of the following claims.

I claim:
1. In a wall periscope for mounting in a wall of a chamber having a viewing head disposed within said chamber adjacent said wall and including a pair of reflecting prisms, means mounting one of said prisms for rotation around a first axis, and means mounting the other prism for rotation around said first axis and a second axis at right angles to and intersecting said first axis in the reflecting surface of said one prism, the combination of an annular collar rotatably mounted on said wall coaxial with said first axis of said prisms, sealing means engaging said collar and wall and preventing leakage therebetween, said collar having an outer inclined end lying in a plane disposed at an acute angle to the axis of said collar, a transparent, semi-spherical dome having a peripheral edge secured to said annular surface in gas-tight relation thereto, a portion of said peripheral edge being closer to said wall than the intersection of the axes of said prisms, said one prism having its rotational axis substantially coaxial with said collar, said other prism being disposed eccentrically of the center of curvature of said dome, and an achromatic doublet compensating lens mounted in front of and movable with said other of said prisms to compensate for distortion resulting from eccentricity of said prism with respect to said dome.

2. A wall periscope as set forth in claim 1 in which the center of curvature of said dome coincides with the intersection of the axes of rotation of said prisms.

3. In a wall periscope for mounting in a wall of a chamber, said periscope having a viewing tube with an end extending through said wall a viewing dome covering the end of said viewing tube disposed within said chamber adjacent said wall and mounted in gas-tight relation thereto, and including a pair of reflecting prisms, means mounting one of said prisms for rotation around a first optical axis extending lengthwise of said viewing tube and means mounting the other prism for rotation around said first axis and a second axis at right angles to and intersecting said first axis in the reflecting surface of said one prism, the combination of a semi-spherical viewing surface on said dome having its center of curvature at the intersection of said axes and a peripheral edge portion closer to the wall than the intersection of the axes of said prisms, said other prism being disposed eccentrically of the center of curvature of said semi-spherical surface, and an achromatic doublet compensating lens mounted in front of and movable with said other prism to compensate for distortion resulting from eccentricity of said other prism with respect to said viewing surface.

4. In a wall periscope for mounting in a wall of a chamber, said periscope having a viewing tube with an end extending through said wall, a viewing dome disposed within said chamber adjacent said wall and mounted in gas-tight relation thereto, and including a pair of reflecting prisms, means mounting one of said prisms for rotation around a first optical axis extending lengthwise of said tube and means mounting the other prism for rotation around said first axis and a second axis at right angles to and intersecting said first axis in the reflecting surface of said one prism, the combination of a viewing surface in said dome which is a portion of a sphere having its center of curvature at the intersection of said axes, said other prism being disposed eccentrically of the center of curvature of said partly-spherical surface, and an achromatic doublet compensating lens mounted in front of and movable with said other prism to compensate for distortion resulting from eccentricity of said other prism with respect to said viewing surface.

References Cited by the Examiner

UNITED STATES PATENTS

| 1,520,245 | 12/24 | Humbrecht | 88—72 |
| 2,421,805 | 6/47 | Peck | 88—57 |
| 2,442,564 | 6/48 | Heyer | 88—57 |
| 2,592,222 | 4/52 | Williams | 88—57 |

FOREIGN PATENTS

| 348,835 | 2/22 | Germany. |
| 274,912 | 1/29 | Great Britain. |

JEWELL H. PEDERSEN, *Primary Examiner.*

EMIL G. ANDERSON, FREDERICK M. STRADER,
*Examiners.*